(12) United States Patent
Suzuki et al.

(10) Patent No.: US 7,483,785 B2
(45) Date of Patent: Jan. 27, 2009

(54) NAVIGATION APPARATUS

(75) Inventors: Daisuke Suzuki, Ama-gun (JP); Naohiro Sakashita, Obu (JP)

(73) Assignee: DENSO CORPORATION, Kariya (JP)

( * ) Notice: Subject to any disclaimer, the term of this patent is extended or adjusted under 35 U.S.C. 154(b) by 673 days.

(21) Appl. No.: 11/004,938

(22) Filed: Dec. 7, 2004

(65) Prior Publication Data

US 2005/0159884 A1 Jul. 21, 2005

(30) Foreign Application Priority Data

Jan. 15, 2004 (JP) ............................. 2004-008210

(51) Int. Cl.
*G01C 21/00* (2006.01)
(52) U.S. Cl. .................... 701/200; 701/300; 340/995.2
(58) Field of Classification Search ................ 701/208, 701/200, 205, 300; 340/995, 995.2
See application file for complete search history.

(56) References Cited

U.S. PATENT DOCUMENTS

| | | | |
|---|---|---|---|
| 5,729,109 A * | 3/1998 | Kaneko et al. ............... 318/587 |
| 5,874,905 A * | 2/1999 | Nanba et al. ............. 340/995.2 |
| 6,119,066 A | 9/2000 | Sugiura et al. |
| 6,163,750 A | 12/2000 | Nojima |
| 6,636,806 B1 * | 10/2003 | Irie ........................... 701/211 |
| 7,277,846 B2 | 10/2007 | Satoh |
| 2003/0074131 A1 * | 4/2003 | Barkowski et al. .......... 701/200 |
| 2005/0004753 A1 * | 1/2005 | Weiland et al. ............. 701/208 |

FOREIGN PATENT DOCUMENTS

| | | |
|---|---|---|
| JP | A-7-272197 | 10/1995 |
| JP | A-11-083518 | 3/1999 |
| JP | A-2002-245593 | 8/2002 |
| JP | B2-3409657 | 3/2003 |
| JP | A-2003-130665 | 5/2003 |
| JP | A-2003-240587 | 8/2003 |

OTHER PUBLICATIONS

First Office Action from Chinese Patent Office issued on Sep. 8, 2006 for the corresponding Chinese patent application No. 2005100057034 (a copy and English translation thereof).
Office Action dated Sep. 9, 2008 in corresponding Japanese Patent Application No. 2004-008210 (and English translation).

* cited by examiner

*Primary Examiner*—Mark Hellner
(74) *Attorney, Agent, or Firm*—Posz Law Group, PLC

(57) ABSTRACT

A storage medium of a car navigation apparatus holds painted road sign information that is linked to a running lane of an approach road around an intersection. Suppose that a direction of an exit road with respect to an approach road at an intersection belongs to a peripheral portion of one of directional areas that are provided to determine at an intersection the approximate direction of the exit road with respect to the approach road. In this case, the approximate direction is specified based on the corresponding painted road sign information. The specified approximate direction is then outputted as a voice and/or image display. Thus, utilizing the painted road sign information can reduce user's disagreeable feeling to the approximate direction.

12 Claims, 6 Drawing Sheets

| GUIDE DATA TABLE |
|---|
| NODE 32 |
| ROAD NAME |
| NODE NAME |
| NUMBER OF NODE APPROACH LANES |
| NODE-EXIT DIRECTION LANE POSITION |
| NODE EXIT DIRECTION |
| LANE-PAINTED ROAD SIGN INFORMATION |
| ⋮ ←—43 |

FIG. 5

| LANE-PAINTED ROAD SIGN INFORMATION | |
|---|---|
| BIT POSITION | PRESENCE/ABSENCE OF PAINTED ROAD SIGN IN EACH DIRECTION (PRESENT: BIT=1, ABSENT: BIT=0) |
| 7 | BIT=1: STRAIGHT FORWARD D. |
| 6 | BIT=1: DIAGONAL RIGHTWARD D. |
| 5 | BIT=1: RIGHTWARD D. |
| 4 | BIT=1: DIAGONAL RIGHT BACKWARD D. |
| 3 | BIT=1: RETURNING D. |
| 2 | BIT=1: DIAGONAL LEFT BACKWARD D. |
| 1 | BIT=1: LEFTWARD D. |
| 0 | BIT=1: DIAGONAL LEFTWARD D. |

NAVIGATION APPARATUS

CROSS REFERENCE TO RELATED APPLICATIONS

This application is based on and incorporates herein by reference Japanese Patent Application No. 2004-8210 filed on Jan. 15, 2004.

FIELD OF THE INVENTION

The present invention relates to a navigation apparatus to specify at an intersection an approximate direction of an exit road with respect to an approach road.

BACKGROUND OF THE INVENTION

Figure 9:
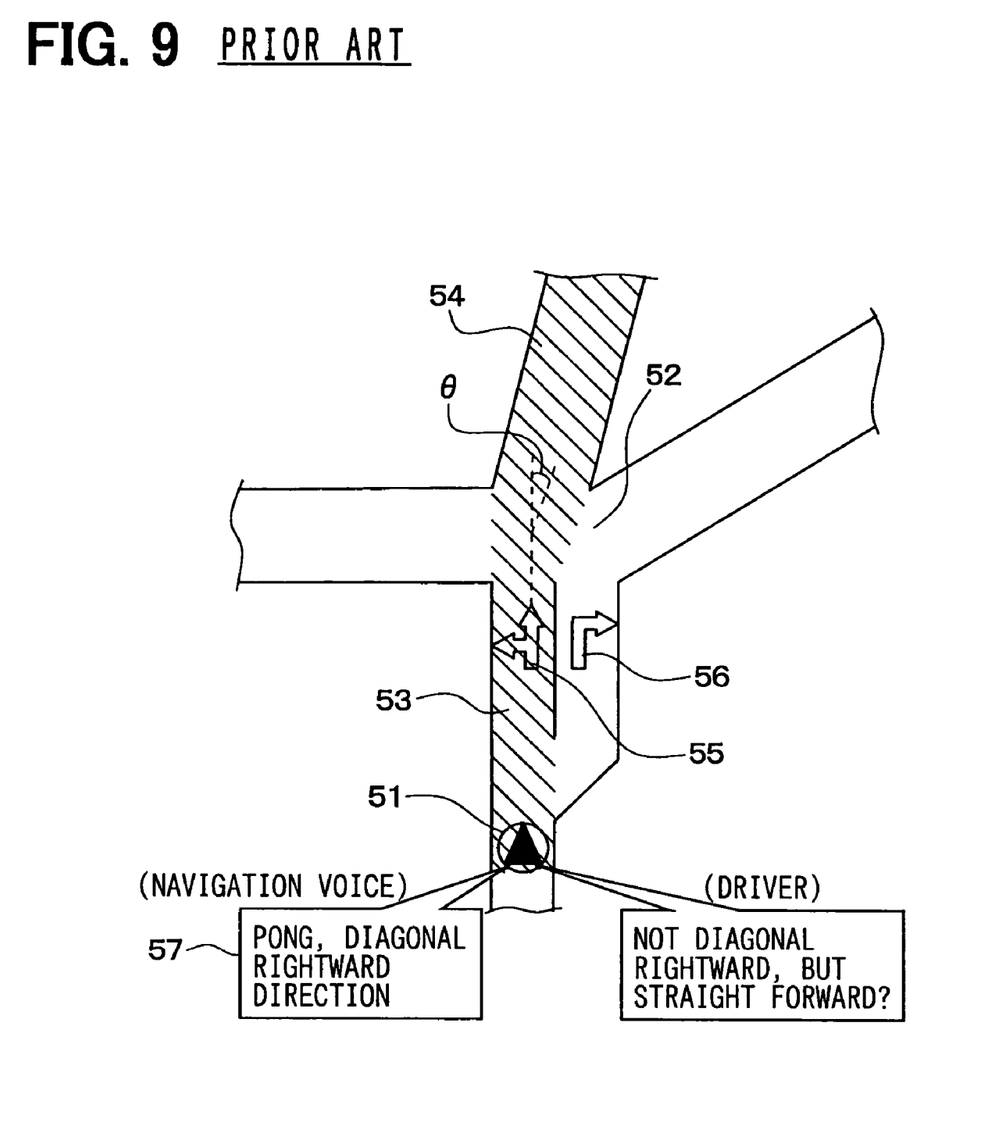
FIG. 9 is an explanatory view for performing right/left turn direction determination and voice output of the result of the determination in a prior art.

Conventionally, some car navigation apparatuses perform right/left turn direction determination. The right/left turn direction determination means specifying an approximate direction of an exit road with respect to an approach road, at an intersection. FIG. 9 shows a bird's-eye view of an intersection as an example of right/left turn direction determination and voice output of the result of the determination.

A vehicle 51 having a car navigation apparatus (not shown) enters an intersection 52 from an approach road 53, and then moves out the intersection 52 to an exit road 54, in accordance with route guidance (a hatched portion is a guide route) by the car navigation apparatus.

Immediately before the vehicle 51 enters the intersection 52, the car navigation apparatus performs right/left turn direction determination. First, an angle θ of the exit road 54 to the approach road 53 is specified from map information. Then, one of multiple directional areas, straight forward direction, diagonal rightward direction, right frontward direction, rightward direction, diagonal right backward direction, right returning direction, returning direction, left returning direction, diagonal left backward direction, leftward direction, left frontward direction, and diagonal leftward direction, is specified as a directional area to which the exit road 54 belongs with respect to the approach road 53. Then, the specified directional area is determined as an approximate direction of the exit road 54 with respect to the approach road 53.

Then the car navigation apparatus outputs, e.g., a voice 57 "Pong, diagonal rightward direction," as the specified approximate direction.

In the right/left turn direction determination, the car navigation apparatus specifies the approximate direction of the exit road 54 to the approach road 53 simply by determining a directional area to which the above angle θ belongs.

However, in this simple right/left turn direction determination, a user's sense of direction is sometimes shifted from the approximate direction specified by the car navigation apparatus.

For example, in a case where a threshold angle dividing the straight forward direction and the diagonal rightward direction is 15°, if the angle θ in FIG. 9 is 14°, the approximate direction becomes the straight forward direction. Further, if the angle θ is 16°, the approximate direction becomes the diagonal rightward direction. However, even if the angle θ is 16° and the voice 57 "Pong, diagonal rightward direction" is outputted, the user of the vehicle 51 may feel that the direction of the exit road 54 is closer to the straight forward direction from the angle of another road connected to the intersection 52 or the like. In this case, it is unclear for the user whether the voice guidance indicates the exit road 54 or a right side exit road 58 different from the guide route. Further, even if the user understands that the voice guidance indicates the exit road 54 by another guide display, the user might feel "the exit road 54 is in the straight forward direction"?

On the other hand, in many cases, at an intersection, an intersection exit direction is visually displayed with a painted road sign, a road traffic sign on the side of the road and the like. In FIG. 9, a painted road sign 55 is provided on a straight forward lane of the approach road 53 and a painted road sign 56 is provided on a right turn lane of the approach road 53. According to the inventor's study, such display approximately corresponds with a vehicle user's sense of direction. Further, in many cases, these information of visual intersection exit direction are recorded on map data of a car navigation apparatus.

SUMMARY OF THE INVENTION

It is an object of the present invention to provide a navigation apparatus to indicate an approximate direction of an exit road with respect to an approach road, at an intersection for a user, which can reduce the user's disagreeable feeling to the approximate direction by utilizing information on visual intersection exit direction display provided on the road.

To achieve the above object, the present invention provides a navigation apparatus comprising: a storage medium for including exit direction information based on visual exit direction display provided around an intersection; a specifying unit for specifying at the intersection an approximate direction of an exit road with respect to an approach road, based on the exit direction information stored on the storage medium; and a display unit for displaying the exit road based on the specified approximate direction.

According to the above construction, the navigation apparatus specifies an approximate direction of an exit road to an approach road at an intersection, based on exit direction information stored on a storage medium, based on visual exit direction display provided around the intersection, and provides a display based on the specified direction. Accordingly, in the navigation apparatus to indicate an approximate direction of an exit road to an approach road in an intersection for a user, the user's disagreeable feeling to the approximate direction can be reduced by utilizing information on visual intersection exit direction display provided on the road.

Note that the approximate direction of exit road to an approach road means, not a detailed angle of the exit road to the approach road, but a direction which the user can roughly grasp the direction of the exit road such as straight forward, right turn, left turn, diagonal rightward and along the road.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
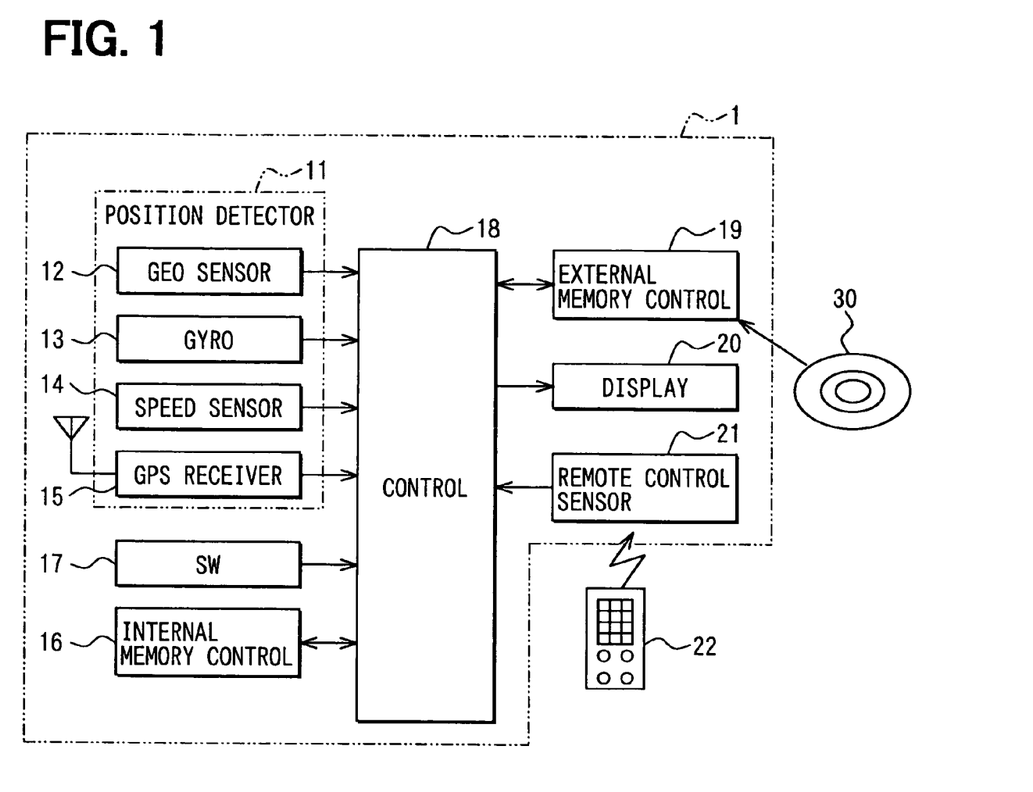
FIG. 1 is a block diagram showing the construction of a car navigation apparatus according to an embodiment of the present invention.

An embodiment of the present invention will be described hereinbelow. FIG. 1 shows a construction of a car navigation apparatus 1 according to an embodiment of the present embodiment. The car navigation apparatus 1 has a position detector 11, an internal memory control unit 16, an operation switch group 17, an external memory control unit 19, a display unit 20, a remote control sensor 21, and a control circuit 18 connected to these units.

The display unit 20, having a speaker and a display surface such as a liquid crystal display, displays a video image on the display surface in correspondence with a video signal inputted from the control circuit 18. Further, the display unit 20 outputs a voice from the speaker in correspondence with a voice signal inputted from the control circuit 18.

The operation switch group 17 includes input units including multiple mechanical switches provided around the display surface of the display unit 20 and a touch panel provided over the display surface. The operation switch group 17 outputs a signal, based on user's operations of depressing a mechanical switch (e.g., holding down the depression button) and touching the touch panel or the like, to the control circuit 18.

The remote control sensor 21 outputs a signal, received from a remote controller 22 which transmits a radio signal by infrared radiation or the like based on the user's operation, to the control circuit 18.

The position detector 11 has a well-known geomagnetic sensor 12, a gyroscope 13, a vehicle speed sensor 14, and a GPS receiver 15 for GPS (Global Positioning System) to detect a vehicle position based on radio waves from satellites. These sensors and the like 12 to 15 output information to specify a current position based on their respective characteristics to the control circuit 18. Further, the position detector 11 can additionally have a steering revolution sensor (not shown), vehicle wheel sensors for respective wheels and the like.

The internal memory control unit 16, having a nonvolatile storage medium such as a HDD (Hard Disk Drive), controls data reading, and if possible, data writing, from/to the nonvolatile storage medium, based on a control command or the like from the control circuit 18. Information stored on the nonvolatile storage medium are so-called map matching data for improvement in position detection accuracy, various data including map data and landmark data, a program for the operation of the car navigation apparatus 1, and the like.

The external memory control unit 19 controls data reading, and if possible, data writing, from/to a removable external storage medium 30 such as a DVD-ROM, a memory stick or a memory card. Information stored on the external storage medium 30 are additional data to the map matching data, the map data, the landmark data and the like.

Figure 2:
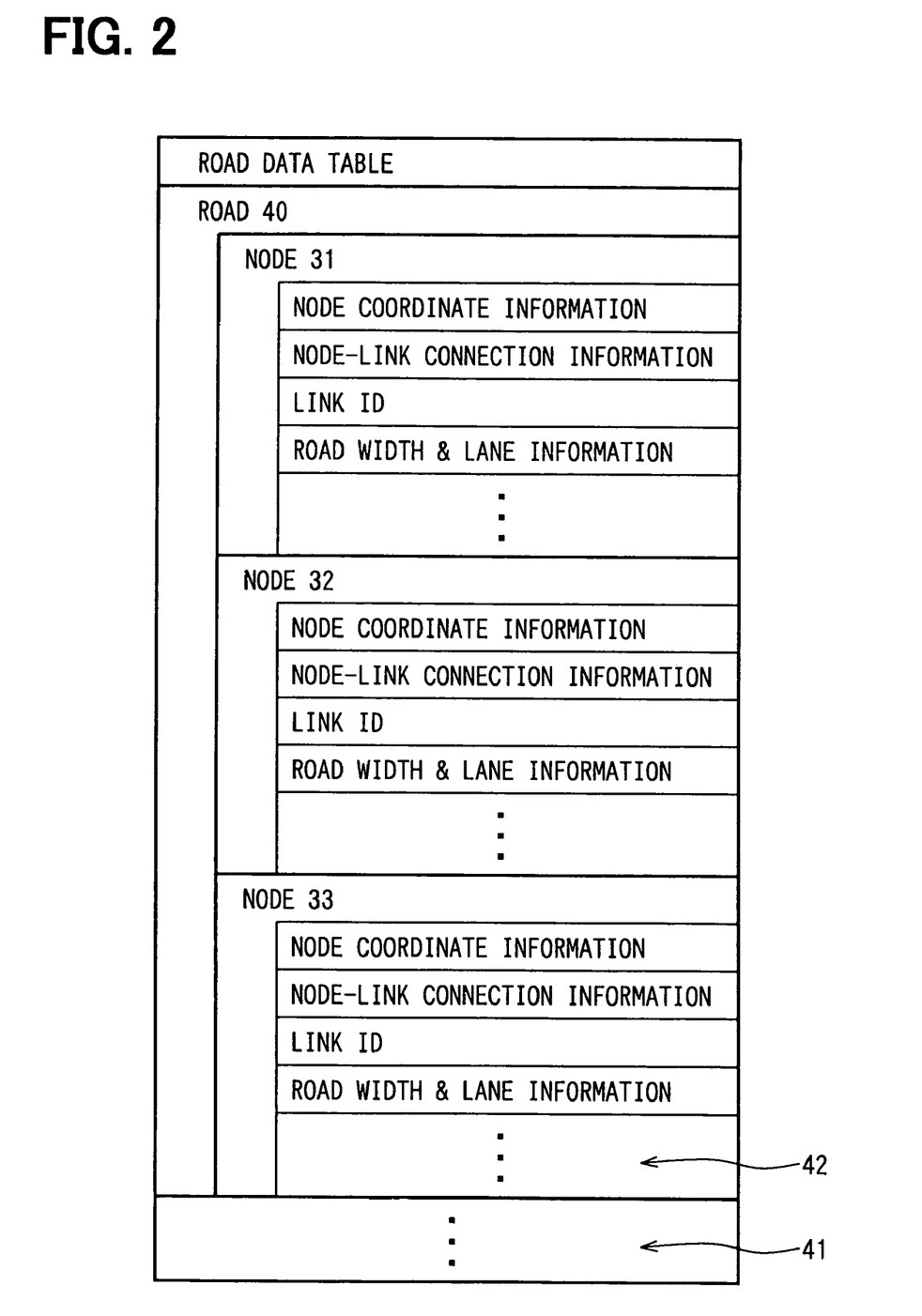
FIG. 2 shows a structure of a road data table.

The map data held in the internal memory control unit 16 or the external storage medium 30 includes a road data table. FIG. 2 schematically shows the structure of the road data table. The road data table includes multiple road tables.

Figure 3:
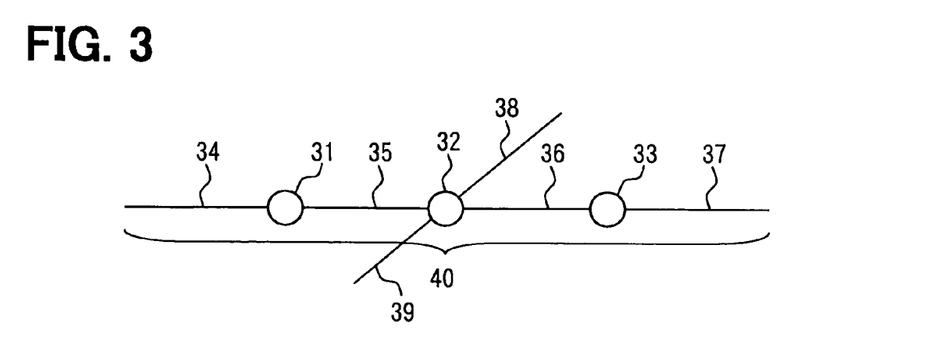
FIG. 3 is a schematic diagram showing a structure of a road.

The road table is provided for each one-side road. The one-side road is uniquely determined by specifying a road comprising multiple links and nodes, and its direction (forward or backward direction, upward or downward direction or the like). FIG. 3 shows a one-side road 40. The one-side road 40 is a road comprising a link 34, a node 31, a link 35, a node 32, a link 36, a node 33 and a link 37, corresponding to the direction along the described order as a forward direction. Note that when a vehicle runs on a one-side road along its direction, a node to enter one node of the one-side road is referred to as a "immediately previous link" of the node. In FIG. 2, the road data table includes the road table of the one-side road 40 and other road tables (corresponding to dot-abbreviated indication 41).

Each road table has multiple node tables each provided for each node of the road. In FIG. 2, the road data table includes node tables of the node 31, the node 32 and the node 33, and other node tables (corresponding to dot-abbreviated indication 42).

Each node table has information on the node, i.e., node coordinate information, node-link connection information, link ID, road width & lane information and the like. The node coordinate information indicates the latitude and longitude of the point of the node. The node-link connection information indicates (one or multiple) link connected to the node, the angle of the link to the immediately previous link of the node, and a lane in the immediately previous link to withdraw from the link of the node. The link ID indicates identification information of link following the node in the one-side road. The road width & lane information indicates the road width and the number of lanes of the immediately previous link of the node in the one-side road.

Figure 4:
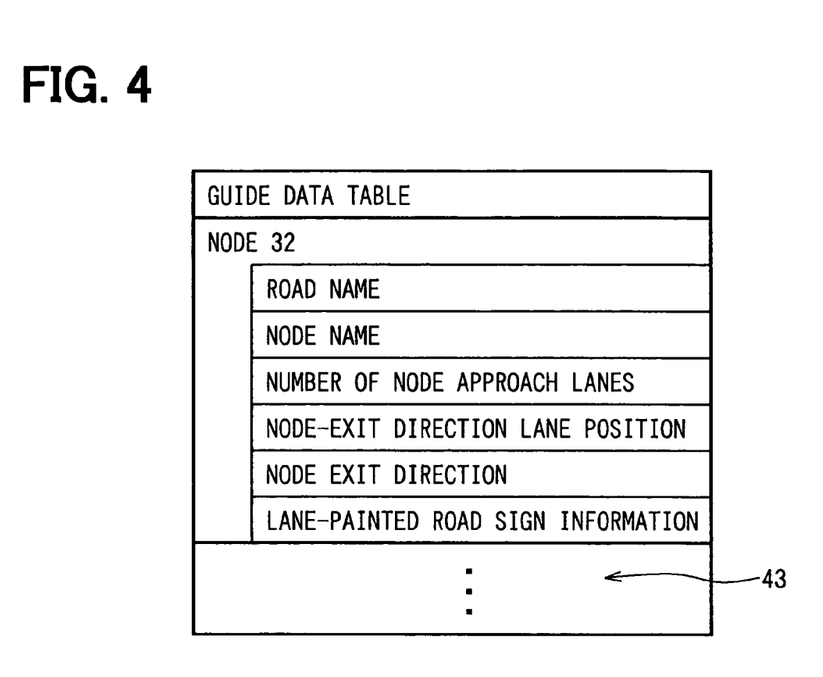
FIG. 4 shows a structure of a guide data table.

Further, the map data held in the internal memory control unit 16 or the external storage medium 30 includes a guide data table. FIG. 4 schematically shows the structure of the guide data table. The guide data table has multiple additional node tables provided for the node tables in the road data table. In FIG. 4, the guide data table includes an additional node table corresponding to the node table of the node 32 in the one-side road 40, and other additional node tables (corresponding to dot-abbreviated indication 43).

The additional node table has information for enlarged display of a part of guide route (e.g., an intersection). The additional node table has information such as a road name, a node name, the number of node approach lanes, a node exit direction lane position, a node exit direction, and lane painted road sign information. The road name indicates the name of the one-side road corresponding to the road table including the node table. The node name indicates the name of the node corresponding to the node table (e.g., the name of intersection). The number of node approach lanes indicates the number of lanes of the immediately previous node of the present node. The node exit direction lane position indicates a lane in the immediately previous link to withdraw from the node in the one-side road from the link following the present node. The node exit direction indicates an angle of the link following the present node to the immediately previous link in the one-side road.

The lane painted road sign information indicates the direction indicated with a painted road sign drawn on each lane in the immediately previous link. The painted road sign is visual direction display such as an arrow to schematically show a link from which the vehicle is to withdraw from the node when the vehicle enters the node from the lane with the painted road sign. This display approximately corresponds with the vehicle user's sense of direction.

Figure 5:
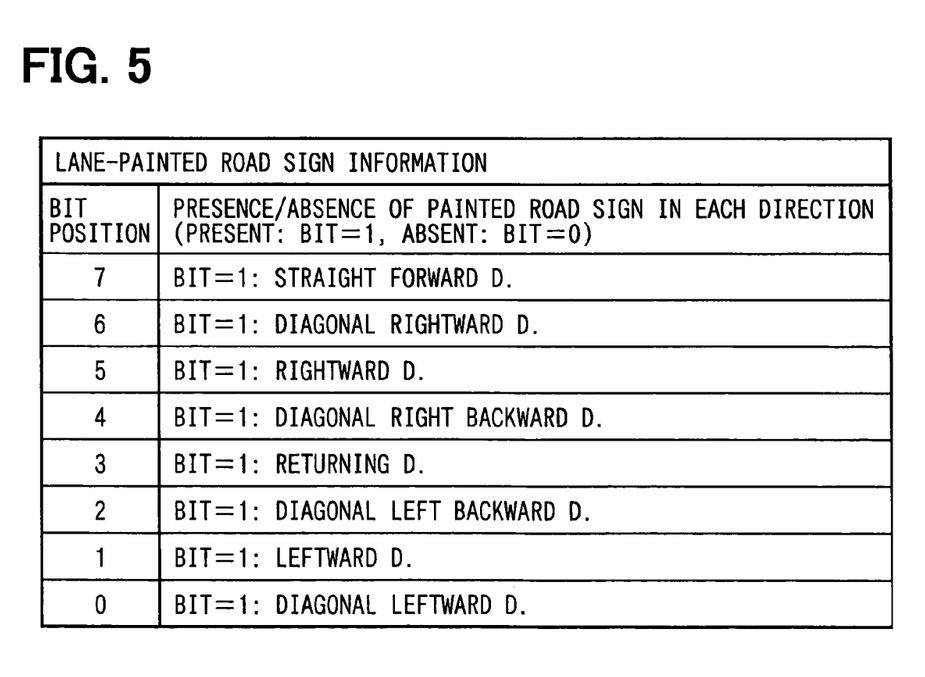
FIG. 5 is a table showing correspondence between respective bits of lane painted road sign information and meanings allocated to the respective bits.

The lane painted road sign information is 8-bit data. FIG. 5 shows a table of correspondence between respective bits of the lane painted road sign information and meanings allocated to the respective bits. In the lane painted road sign information, the 7th bit (most significant bit) to the 0th bit (least significant bit) correspond to 8 directions, i.e., straight forward direction, diagonal rightward direction, rightward direction, diagonal right backward direction, returning direction, diagonal left backward direction, leftward direction, and diagonal leftward direction. The value of a bit in the direction indicated with the painted road sign of the lane is "1," while the value of a bit in the direction not indicated with the painted road sign is "0." For example, regarding the lane painted road sign information for a lane with "straight forward" and "left turn" painted road signs, the values of the 7th bit and the 1st bit are "1" and the values of the other bits, "0."

The control circuit 18 is constructed as a general computer. The control circuit 18 includes a CPU, a ROM, a RAM, a flash memory, an I/O and a bus line connecting these units. The control circuit 18 executes programs for the operation of the car navigation apparatus 1, read from the ROM, the internal memory control unit 16, and the external storage medium 30. Upon execution of the program, the control circuit 18 reads information from the ROM, the RAM or the flash memory, and writes information to the RAM and the flash memory, and transmits/receives signals to/from the position detector 11, the operation switch group 17, the external memory control unit 19, the display unit 20, the remote control sensor 21 and the like, via the I/O.

When the car navigation apparatus 1 is started, the CPU of the control circuit 18 reads a boot program, an operating system (OS) and the like from the ROM and executes them, to perform hardware control and process management based on the OS. The processes operating on the OS are a menu program, a destination setting program, a route search program, a map display program and other programs.

Note that upon execution of these programs, if it is necessary to specify a current position, the CPU of the control circuit 18 calculates the current position based on signals to specify the current position outputted from the sensors 12 to 15 of the position detector 11. At this time, as the outputs from the various sensors 12 to 15 have respectively different types of errors, the current position is specified by the CPU of the control circuit 18 by complementarily using the multiple sensors.

Hereinbelow, the operations for the CPU to read and execute the program will be described as the operation of the program itself.

The menu program hierarchically menu-displays the various programs operating on the OS based on program function, purpose or the like, such that execution of a program selected by the user from the menu-display is started. Note that the menu-display is made by outputting menu image data to the display unit 20, and further, the user's selection is detected based on a signal inputted into the control circuit 18 by a selection operation (cursor movement, depression of determination button or the like) to the remote controller 22 via the remote control sensor or the operation switch group 17.

The destination setting program is used for setting a destination. The destination setting program causes the display unit 20 to provide a display urging the user to input a destination, and based on the user's input of destination using the remote controller 22 or the operation switch group 17, stores the destination into the RAM of the control circuit 18, thereby realizing the setting.

The route search program automatically selects an optimum route from the current position to the destination set by the destination setting program, and causes the display unit 20 to display the selected route as a guide route. As the automatic setting of optimum route, the Dijkstra method and the like are known.

The map display program superposes a vehicle current position mark based on the specified current position information, map data read by using the internal memory control unit 16 or the external memory control unit 19, and additional data such as the guide route formed by the route search program, and causes the display unit 20 to display the superposed data on the display surface. Further, when the vehicle is approaching an intersection in the guide route, the map display program causes the display 20 to provide voice output or video image display regarding how the vehicle is to turn the intersection. For example, in the case of right turn or left turn, voice output "Turn right," "Turn left," or the like is made. If the guide route is along the road, no voice output is made.

The above determination of turning of the guide route is schematically made by executing a right turn/left turn direction determination program called from the map display program, by the control circuit 18.

Figure 6:
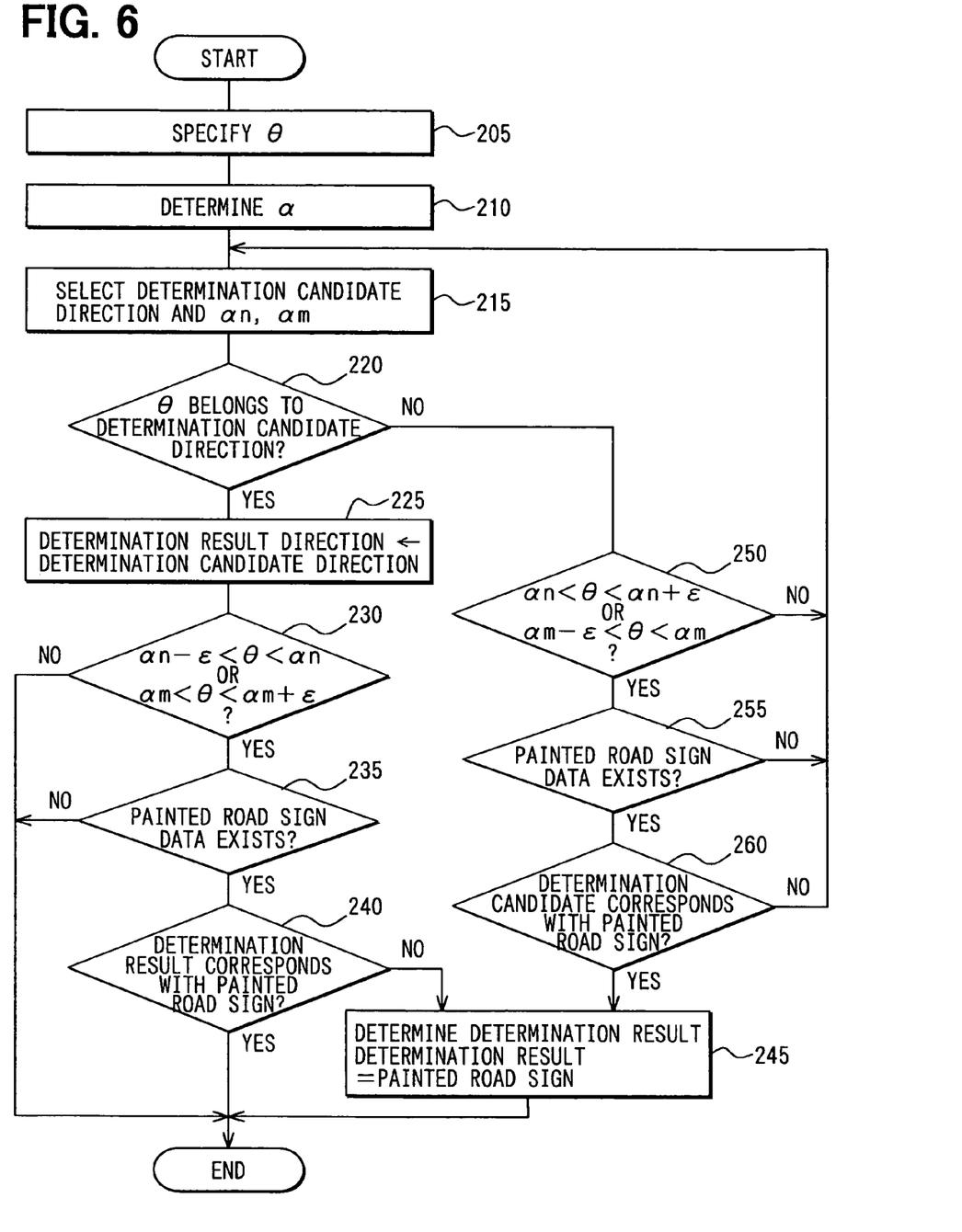
FIG. 6 is a flowchart showing a right/left turn direction determination program executed by a control circuit.

FIG. 6 is a flowchart showing the right/left turn direction determination program. The control circuit 18 executes the program, thereby, first specifies an angle $\theta$ between an approach link and an exit link in a subject node, at Step 205. The subject node means a node corresponding to an intersection as the subject of determination of approximate direction of exit road to the approach road. In a case where the right/left turn direction determination program is called from the map display program, a node corresponding to an intersection through which the vehicle is to pass next is the subject node. Further, the approach link is a link immediately prior to the subject node in the guide route, and the exit link, a link immediately subsequent to the subject node in the guide route. If the approach direction of the approach link and the exit direction of the exit link are the same, the angle $\theta$ is zero; if the exit link orthogonally turns right to the approach link, the angle $\theta$ is 90°; if the exit link orthogonally turns left to the approach link, the angle $\theta$ is −90°.

More particularly, the processing at Step 205 is reading the node table of the subject node included in the road data table (See FIG. 2) of the road proceeding in the approach link in the direction of the subject node, and reading information of the angle of the exit link to the approach link included in the node-link connection information in the node table.

Figure 7:
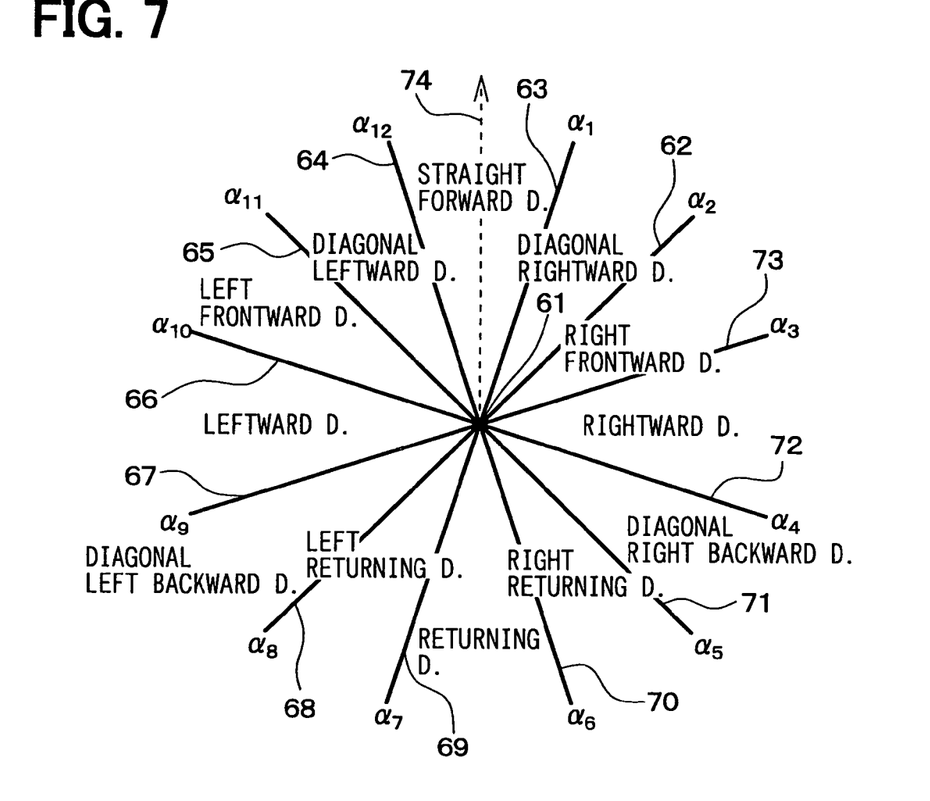
FIG. 7 is an explanatory view showing directional areas provided to determine an approximate direction.

Next, at Step 210, a directional area threshold angle $\alpha_i$ ($i=1, 2, \ldots$) for determination of direction is determined. For determination of the above-described approximate direction, areas in divided directions are used as directional areas. FIG. 7 shows an example of the directional areas and their threshold angles $\alpha_i$. In the figure, a center 61 corresponds to the position of the subject node, and the direction at 360° from the center 61, to a 360° moving direction from the subject node. A direction downward on the drawing is a returning direction from the subject node to the approach link. Line segments 62 to 73 indicate the threshold angles $\alpha_i$ (in FIG. 7, $i=1, \ldots, 12$) to divide the 360° direction into 12 directional areas. Note that the threshold angle $\alpha_i$ is a clockwise rotation angle from a direction moving straight forward from the approach link through the center 61 (corresponding to the direction of a dotted arrow 74) with the center 61 as an axis, having a value area greater than −180° and equal to or less than +180°. In this case, in the threshold angles $\alpha_1 \ldots \alpha_{12}$, the value increases by 30°, i.e., $\alpha_7$ (=−165°), $\alpha_8, \alpha_9, \alpha_{10}, \alpha_{11}, \alpha_{12}, \alpha_1, \alpha_2, \alpha_3, \alpha_4, \alpha_5, \alpha_6$ (=+165°). The area between the threshold angles $\alpha_{12}$ and $\alpha_1$ is a directional area corresponding to the approximate straight forward direction; the area between the threshold angles $\alpha_1$ and $\alpha_2$ is a directional area corresponding to the approximate diagonal rightward direction; the area between the threshold angles $\alpha_2$ and $\alpha_3$ is a directional area corresponding to the approximate right forward direction; the area between the threshold angles $\alpha_3$ and $\alpha_4$ is a directional area corresponding to the approximate rightward direction; the area between the threshold angles $\alpha_4$ and $\alpha_5$ is a directional area corresponding to the approximate diagonal right backward direction; the area between the threshold angles $\alpha_5$ and $\alpha_6$ is a directional area corresponding to the approximate right returning direction; the area between the threshold angles $\alpha_6$ and $\alpha_7$ is a directional area corresponding to the approximate returning direction; the area between the threshold angles $\alpha_7$ and $\alpha_8$ is a directional area corresponding to the approximate left returning direction; the area between the threshold angles $\alpha_8$ and $\alpha_9$ is a directional area corresponding to the approximate diagonal left backward direction; the area between the threshold angles $\alpha_9$ and $\alpha_{10}$ is a directional area corresponding to the approximate leftward direction; the area between the threshold angles $\alpha_{10}$ and $\alpha_{11}$ is a directional area corresponding to the approximate left forward direction; and the area between the threshold angles $\alpha_{11}$ and $\alpha_{12}$ is a directional area corresponding to the approximate diagonal leftward direction.

At Step 210, the number of such directional area threshold angles $\alpha_i$ and respective values of the threshold angles $\alpha_i$ are determined based on information such as the shape of intersection of the subject node (three-forked road, four-forked road or the like), the road type of link connected to the subject node, the road width, the angle, and whether or not the subject node is connected to a road along a traveling direction. For example, if the intersection of the subject node is a three-forked road, the number of threshold angles $\alpha_i$ is set so as to provide directional areas corresponding to a multiple of "3." If the intersection of the subject node is a four-forked road, the number of threshold angles $\alpha_i$ is set so as to provide directional areas corresponding to a multiple of "4." Further, the values of the threshold angles $\alpha_i$ are set such that the direction of the link connected to the subject node passes the center of one directional area.

At Step 215, one directional area as a determination candidate and its both side threshold angles are selected. The selection of directional area is made based on the number of times of execution of this Step 215 since the start of the right/left turn direction determination program. More particularly, if the current selection is the j-th selection, a directional area where the greater threshold angle becomes $\alpha_j$ is selected. Hereinbelow, the selected both side threshold angles are $\alpha_m$, $\alpha_n$ (note that $\alpha_m < \alpha_n$). Note that only if the selected directional area is between the line segments 69 and 70, $\alpha_7 = 195°$ holds.

Next, at Step 220, it is determined whether or not the angle $\theta$ specified at Step 210 belongs to the determination candidate directional area selected at Step 215. More particularly, it is determined whether or not $\alpha_m < \theta < \alpha_n$ holds. If the angle $\theta$ belongs to the directional area, the process proceeds to Step 225, while if the angle $\theta$ does not belong to the directional area, the process proceeds to Step 250.

At Step 225, the current determination candidate directional area is determined as a direction as a determination result direction. The direction as a result of determination means an approximate direction as a returned value called and returned by the right/left turn direction determination program to the call originating program. The call originating program performs display of approximate direction or the like in correspondence with the returned value.

At Step 230, it is determined whether or not the angle $\theta$ belongs to a peripheral portion of an area corresponding to the determination result direction. More particularly, it is determined whether $\alpha_n - \epsilon < \theta \leq \alpha_n$ or $\alpha_m < \theta < \alpha_m + \epsilon$ holds, or none of them holds. Note that $\epsilon$ is a predetermined angle. If the angle $\theta$ belongs to a peripheral portion, the process proceeds to Step 235, while if the angle $\theta$ does not belong to a peripheral portion, the process ends, and the returned value is returned to the call originating program.

Figure 8:
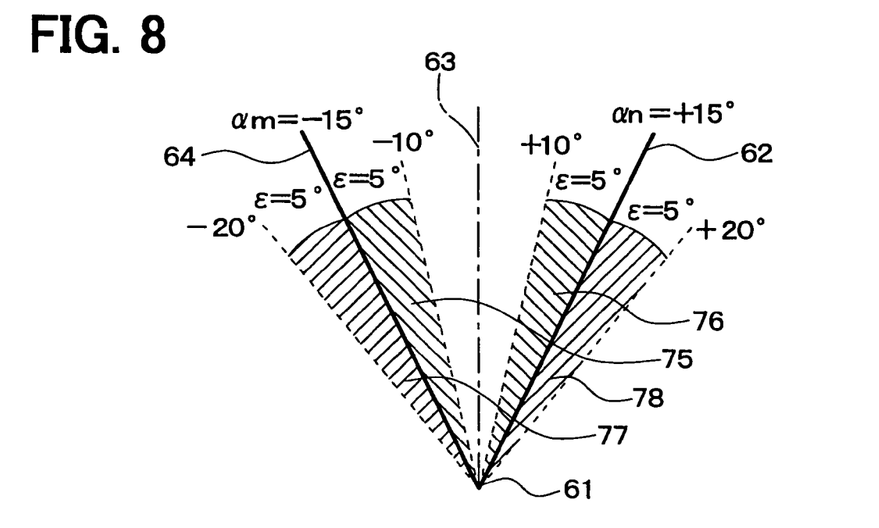
FIG. 8 is an explanatory view showing peripheral portions of a directional area.

FIG. 8 is an explanatory view showing peripheral portions of a directional area. In the figure, in a directional area as shown in FIG. 7, $\alpha_m = \alpha_{12}$ and $\alpha_n = \alpha_1$ hold. Note that in this example, $\epsilon = 5°$ holds. In this case, in hatched portions 75 and 76, i.e., both end ranges −15° to −10° and 10° to 15° in the directional area corresponding to the straight forward direction are peripheral portions of the directional area.

At Step 235, it is determined whether or not painted road sign data corresponding to an approach lane exists. The approach lane means a lane designated by the guide route among multiple lanes of the approach link. As particular processing, the additional node table (See FIG. 4) corresponding to the subject node, included in the road data table (See FIG. 2) of the road in the direction of the subject node in the approach link, is read from the road data table, then the lane painted road sign information is read, and it is determined whether or not the painted road sign information (See FIG. 5) for the approach lane is stored. It may be determined that no painted road sign information exists if all the bits of the lane painted road sign information are "0," otherwise it may be determined that no painted road sign information exists if no area of lane painted road sign information exists. If painted road sign data corresponding to the approach lane exists, the process proceeds to Step 240, otherwise, the process ends, and the returned value is returned to the call originating program.

At Step 240, it is determined whether or not the determination result direction and the direction of the painted road sign substantially correspond with each other. More particularly, the respective bits of the painted road sign data (See FIG. 5) determined as "exists" at Step 235 are read, and it is determined whether or not the bit corresponding to the determination result direction is "1."

The correspondence between the determination result direction and the bit position corresponding to the directional area is as follows. That is, the straight forward direction corresponds to the 7th bit; the diagonal rightward and the right forward directions, to the 6th bit; the rightward direction, to the 5th bit; the diagonal right backward and the right returning directions, to the 4th bit; the returning direction, to the 3rd bit; the diagonal left backward and the left returning directions, to the 2nd bit; the leftward direction, to the 1st bit; and the diagonal leftward and left forward directions, to the 0th bit.

If the determination result direction and the direction of the painted road sign correspond with each other, the process ends, and the returned value is returned to the call originating program. If the directions do not correspond, the process proceeds to Step 245.

At Step 245, the determination result direction is determined. More particularly, the direction of the painted road sign specified at Step 240 or Step 260 is determined as the determination result direction. Then after Step 245, the process ends, and the returned value is returned to the call originating program.

Further, at Step 250, it is determined whether or not the angle θ belongs to a portion circumscribing the determination candidate directional area. More particularly, it is determined whether an $\alpha_n < \theta \leq \alpha_n + \epsilon$ or $\alpha_m - \epsilon < \theta < \alpha_m$ holds, or none of them holds. If the angle θ belongs to a portion circumscribing the determination candidate directional area, the process proceeds to Step 255, otherwise, the process returns to Step 215, at which a determination candidate directional area is specified again.

The portion circumscribing the determination candidate directional area is hatched portions 77 and 78 in FIG. 8, i.e., the ranges −20° to −15° and 15° to 20° circumscribing the both ends of the directional area corresponding to the straight forward direction.

At Step 255, it is determined whether or not painted road sign data corresponding to an approach lane exists by similar processing to that at Step 235. If painted road sign data corresponding to the approach lane exists, the process proceeds to Step 260, otherwise, the process returns to Step 215, at which a determination candidate directional area is specified again.

At Step 260, it is determined whether or not the determination candidate direction and the direction of the painted road sign substantially correspond with each other, by similar processing to that at Step 240. If the determination candidate direction and the direction of the painted road sign correspond with each other, the process proceeds to Step 245, otherwise, the process returns to Step 215, at which a determination candidate directional area is specified again.

Further, on the map display program side, based on the approximate direction obtained as a returned value, if the direction is not the straight forward direction, voice output of the approximate direction (e.g., "Turn right," "Turn left," or the like) and image display are performed by the display unit 20. Note that the determination as to whether or not the approximate direction obtained as a returned value is the straight forward direction can be regarded as along-a-road determination as to whether or not the exit link to the approach link is along the road. Note that as the image display, turn list display to display approximate direction of exit link to approach link may be performed for the subsequent intersections, in addition to the intersection in which the vehicle is to enter. Further, turn by turn display may be performed to sequentially display only approximate display corresponding to intersection every time the vehicle is to enter an intersection.

The control circuit 18 executes the above-described right/left turn direction determination program, thereby performs the following operations.

That is, the angle θ between the approach link and exit link of the node in the guide route to the destination is specified (Step 205), and based on the angle and other information, the threshold angles $\alpha_i$ and directional areas divided with the angles are determined (Step 210).

Further, in a case where the angle θ belongs to one directional area (Step 220) selected from the directional areas (Step 215), if the angle θ belongs to a peripheral portion of the directional area (Step 230), and the approximate direction of stored painted road sign of the approach lane and the approximate direction of the directional area substantially correspond with each other, the approximate direction of the directional area is displayed by the display unit 20 as an approximate direction of determination subject.

Further, in a case where the angle θ belongs to one directional area selected from the directional areas, if the angle θ belongs to a peripheral portion of the directional area, but the approximate direction of stored painted road sign of the approach lane and the approximate direction of the directional area do not substantially correspond with each other, the approximate direction of the painted road sign is displayed by the display unit 20 as an approximate direction of determination subject.

Further, even in a case where the angle θ belongs to one directional area selected from the directional areas, if the angle θ does not belong to a peripheral portion of the directional area (Step 230), the selected directional area is displayed regardless of the stored information on the painted road sign.

Further, in a case where the angle θ does not belong to (Step 220) one directional area selected from the directional areas (Step 215), if the angle θ belongs to a portion circumscribing the one directional area, and the approximate direction of the stored painted road sign of the approach lane and the approximate direction of the directional area substantially correspond with each other, the approximate direction of the painted road sign is displayed by the display unit 20 as the approximate direction of the determination subject.

Further, in a case where the angle θ does not belong to (Step 220) one directional area selected from the directional areas (Step 215), if the angle θ does not belong to a portion circumscribing the one directional area, or if the approximate direction of the stored painted road sign of the approach lane and the approximate direction of the directional area do not substantially correspond with each other, another directional area is selected (Step 215), and the above operations are performed on the directional area.

As described above, the car navigation apparatus 1, having a storage medium (internal memory control unit 16, node 31) holding painted road sign information, provided around an intersection node, corresponding to a running lane of approach link (approach road), operates as follows. In a case where the direction of an exit link (exit road) to an approach link of a node belongs to a peripheral portion of one directional area for determination of approximate direction, based on the painted road sign information of the exit link to an approach lane of the approach link, the approximate direction of the exit link (exit road) to the approach link in the node is specified, and the specified approximate direction of the exit link is voice outputted and/or image displayed.

In this arrangement, in the car navigation apparatus 1, the approximate direction of an exit road to an approach road at an intersection is specified based on the painted road sign information stored in the storage medium, and display is conducted based on the specified direction. Accordingly, in a car navigation apparatus to indicate an approximate direction of an exit road to an approach road at an intersection for a user, the user's disagreeable feeling to the approximate direction can be reduced by utilizing information on visual intersection exit direction display provided on the road.

Note that in the above-described embodiment, the right/left turn direction determination is performed based on the painted road sign information stored on the storage medium, however, the determination is not necessarily performed based on the painted road sign information, but may be performed based on any other exit direction information based on visual intersection exit direction display provided around an intersection. For example, the right/left turn direction determination may be performed based on not a painted road sign but a road traffic sign on the side of the road.

Further, in the above-described embodiment, the right/left turn direction determination is performed based on a painted road sign and the angle θ of the exit link to the approach link, however, it may be arranged such that the direction indicated by visual intersection exit direction display provided around an intersection such as a painted road sign is displayed as an approximate direction regardless of other information.

Further, in the above-described embodiment, the approximate direction of the exit link to the approach link to the guide route is specified, however, it may be arranged such that approximate directions of all the exit roads of an intersection in which the vehicle is to enter are specified and displayed regardless of guide route.

It will be obvious to those skilled in the art that various changes may be made in the above-described embodiments of the present invention. However, the scope of the present invention should be determined by the following claims.

What is claimed is:

1. A navigation apparatus comprising:
    a storage medium that stores, as exit direction information, lane information including visual exit direction display provided around an intersection;
    a determining unit that determines whether or not an angle of an exit road of the intersection with respect to an approach road is included in a peripheral portion of a directional area predetermined around the intersection;
    a specifying unit that specifies at the intersection an approximate direction of the exit road with respect to the approach road, based on the lane information stored on the storage medium instead of the angle of the exit road, when the angle of the exit road is determined to be included in the peripheral portion of the directional area; and
    a display unit that displays the exit road based on the specified approximate direction.

2. The navigation apparatus according to claim 1, wherein the display unit displays the specified approximate direction of the exit road.

3. The navigation apparatus according to claim 1, wherein the specifying unit specifies at the intersection the approximate direction of the exit road with respect to a running lane of the approach road, based on the exit direction information stored on the storage medium.

4. The navigation apparatus according to claim 1, wherein the approach road and the exit road are included within a guide route to a destination.

5. A navigation apparatus comprising:
    a storage medium that stores, as exit direction information, lane information including visual exit direction display provided around an intersection;
    a specifying unit that specifies at the intersection an approximate direction of an exit road with respect to an approach road, based on the exit direction information stored on the storage medium;
    a display unit that displays the exit road based on the specified approximate direction;
    a determining unit that determines whether or not a direction of the exit road with respect to the approach road is included in one of directional areas provided to determine the approximate direction;
    a unit that specifies, based on affirmative result in the determining unit, at the intersection the approximate direction of the exit road with respect to the approach road based on the exit direction information stored on the storage medium when it is determined that the direction of the exit road with respect to the approach road belongs to a peripheral portion of one of the directional areas; and
    a unit that specifies, based on negative result in the determining unit, at the intersection the approximate direction of the exit road with respect to the approach road based on the exit direction information stored on the storage medium when it is determined that the direction of the exit road to the approach road belongs to a portion circumscribing one of the directional areas.

6. A method used in a navigation apparatus storing as exit direction information, lane information including visual exit direction display provided around an intersection, the method comprising:
    determining whether or not an angle of an exit road of the intersection with respect to an approach road is included in a peripheral portion of a directional area predetermined around the intersection;
    specifying at the intersection an approximate direction of the exit road with respect to the approach road, based on the lane information instead of the angle of the exit road when the angle of the exit road is determined to be included in the peripheral portion of the directional area; and
    outputting the exit road based on the specified approximate direction.

7. A method used in a navigation apparatus storing as exit direction information, lane information including visual exit direction display provided around an intersection, the method comprising:
    determining whether or not a direction of an exit road with respect to an approach road is included in one of directional areas provided to determine an approximate direction of the exit road with respect to the approach road;
    specifying, based on affirmative result in the determining, at the intersection the approximate direction based on the exit direction information when it is determined that the direction of the exit road with respect to the approach road belongs to a peripheral portion of one of the directional areas; and
    specifying, based on negative result in the determining, at the intersection the approximate direction based on the exit direction information when it is determined that the direction of the exit road to the approach road belongs to a portion circumscribing one of the directional areas.

8. The navigation apparatus according to claim 1, wherein the lane information stored as the exit direction information is capable of indicating a direction of the exit road with respect to the approach road by using a painted road sign drawn on the approach road, the painted road sign serving as the visual direction display.

9. The method according to claim 6, wherein the lane information stored as the exit direction information is capable of indicating a direction of the exit road with respect to the approach road by using a painted road sign drawn on the approach road, the painted road sign serving as the visual direction display.

10. The method according to claim 7, wherein the lane information stored as the exit direction information is capable of indicating a direction of the exit road with respect to the approach road by using a painted road sign drawn on the approach road, the painted road sign serving as the visual direction display.

11. A navigation apparatus comprising:
    a storage medium that stores, as exit direction information, lane information including visual exit direction display provided around an intersection;
    a specifying unit that specifies at the intersection an approximate direction of an exit road with respect to an approach road, based on the exit direction information stored on the storage medium; and
    a display unit that displays the exit road based on the specified approximate direction, wherein the storage medium is configured to further store node exit direction information indicating an angle between links connected with the intersection, wherein a direction of the exit road with respect to the approach road at the intersection is calculated based on the node exit direction information; and the specifying unit is configured to specify at the intersection the approximate direction of the exit road with respect to the approach road, based on the exit direction information stored on the storage medium if the calculated direction of the exit road is in a peripheral or circumscribing portion, which is present within a predetermined angle from a dividing line between directional areas, which are provided as approximate directions by dividing 360 degrees with respect to the intersection by a predetermined number, which is more than two.

12. A navigation apparatus comprising:

a storage medium configured to store (i) node exit direction information indicating an angle of links connected with an intersection and (ii) lane painted road sign information indicating a direction indicated with a painted road sign drawn on a lane;

an exit direction calculating unit configured to calculate an angle of an exit link with respect to an approach link at the intersection based on the node exit direction information;

a determining unit configured to make a determination as to whether or not the angle of the exit link is included in a peripheral or circumscribing portion, which is present within a predetermined angle from a dividing line between directional areas, which are provided as approximate directions by dividing 360 degrees with respect to the intersection by a predetermined number, which is more than two;

a specifying unit configured to specify, when the determination as to whether or not the angle of the exit link is included in the peripheral or circumscribing portion is affirmed, an approximate direction of the exit link with respect to the approach link based on the painted road sign drawn on the approach link stored in the storage medium without using the node exit information; and a display unit configured to indicate as route guidance a direction from the approach link to the exit link based on the appropriate direction of the exit link specified based on the painted road sign information.

\* \* \* \* \*